United States Patent [19]

Naden et al.

[11] 3,909,810

[45] Sept. 30, 1975

[54] BUBBLE MEMORY MINOR LOOP REDUNDANCY SCHEME

[75] Inventors: Rex A. Naden, Richardson; Forrest G. West, Jr., Dallas, both of Tex.

[73] Assignee: Texas Instruments Incorporated, Dallas, Tex.

[22] Filed: Feb. 25, 1974

[21] Appl. No.: 445,694

[52] U.S. Cl. .................... 340/174 ED; 340/174 TF; 340/174 SR

[51] Int. Cl.[2] .................. G11C 11/14; G11C 19/08

[58] Field of Search... 340/174 ED, 174 TF, 174 SR

[56] References Cited

UNITED STATES PATENTS 3,737,882 6/1973 Furuoya ........................ 340/174 TF 3,792,450 2/1974 Bogar ........................ 340/174 ED

*Primary Examiner*—Stanley M. Urynowicz, Jr.

*Attorney, Agent, or Firm*—Harold Levine; James T. Comfort; William E. Hiller

[57] ABSTRACT

A redundancy bubble memory system comprising data chips having a major-minor loop organization wherein the system may include data chips having one or more faulty minor loops. A flag chip of similar organization is driven and data detected therefrom concurrently with the data chips to prevent faulty loops on the data chips from being read and from being used for data storage. The use of the flag chips in this fashion provides use of a large number of fabricated data chips that would otherwise have to be discarded.

9 Claims, 4 Drawing Figures

BUBBLE MEMORY MINOR LOOP REDUNDANCY SCHEME

BACKGROUND OF THE INVENTION

1. FIELD OF THE INVENTION

This invention pertains to magnetic cylindrical (bubble) memory devices and more particularly to utilizing such devices that may have limited structural faults to attain economic savings while maintaining operational integrity.

2. DESCRIPTION OF THE PRIOR ART

Recently significant interest has developed in a class of magnetic devices known generically as "bubble" domain devices. Such devices described, for example, in IEEE Transactions on Magnetics, Vol MAG, 5, No. 3 (1969) pp. 544–553, "Application of Orthoferrites to Domain-Wall Devices", are generally planar in configuration and are constructed of materials which have magnetically easy directions essentially perpendicular to the plane of the structure. Magentic properties, e.g., magnetization anisotropy, coercivity, mobility, are such that the device may be maintained magnetically saturated with magnetization in a direction out of the plane and that single domain small localized regions of magnetic polarization aligned opposite to the general polarization direction may be supported. Such localized regions, which are generally cylindrical in configuration, represent memory bits. Interest in devices of this nature is, in large part, based on high density and the ability of the cylindrical magnetic domain to be independent of the boundary of the magnetic material in the plane in which it is formed and hence capable of moving anywhere in the plane of the magnetic material to effect various data processing operations.

The bubbles can be manipulated by programming currents through a pattern of conductors positioned adjacent the magnetic material or by varying the surrounding magnetic field. As an example, the magnetic domains or bubbles may be formed in thin platelets having uniaxial anisotropy with the easy magnetic axis perpendicular to the plate comprising such material as rare earth orthoferrite, rare earth aluminum and gallium substituted iron garnets and rare earth cobalt or iron amorphous alloys. Since the magnetic bubbles can be propagated, erased, replicated, and manipulated to form data processing operations and their presence and absence detected, these bubbles may be utilized to perform many of the on-off or primary functions vital to computer operation.

Magnetic bubble memory systems offer significant advantages since logic, memory, counting and switching may all be performed within a single layer of solid magnetic material. This is in contrast to conventional memory systems in which information must move from one device to another through interconnecting conductors and high gain amplifiers. In addition, the actual magnetic material, such as magnetic tape, disc or drum, is transported past sensing and writing devices to effect data operations. In a magnetic bubble memory, however, these functions may all be effected within one continuous ferromagnetic medium and costly interfaces eliminated. The magnetic bubbles representing the data move in a plane of thin sheets of magnetic material such as rare earth orthoferrite crystals, for example, and they can be shifted into precisely defined positions at high speed with little energy. The magnetic material itself remains stationary. With the advent of mixed rare earth aluminum or gallium substituted iron garnets which are capable of providing bit density in the order of $10^6$ per square inch, the development of a reliable solid state material memory equivalent of magnetic disc file or drums has become a particularly attractive and realistic concept.

Many organizations of operable domains have been disclosed. One of the most popular is the major-minor memory organization disclosed in U.S. Pat. No. 3,618,054 or P. I. Bonyhard, U. F. Gianola, and A. J. Perneski. The major-minor loop memory organization as well as its implementation and operation is now well known in the art. The major-minor loop organization as described in U.S. Pat. No. 3,618,054 and elsewhere includes a closed major loop. Typically, this closed loop is established by an arrangement of T-bar permalloy circuits on for example a rare earth orthoferrite platelet. The bubbles circularly propagate around the loop by in-plane rotating magnetic field action. The major loop is generally elongated such as to allow a number of minor loops to be alinged therealong. Two-way transfer gates permit the transfer of bubbles from the minor loop to the major loop and from the major loop to a minor loop. Further access to the major loop is achieved by a detect and read connection thereto and by a separate write connection.

The organization just described permits a synchronized domain pattern, since the propagation of the loops are synchronous with the rotation of the in-plane field. That is, parallel transfer of data bubbles from a plurality of minor loops may be made simultaneously to the major loop. Moreover, a plurality of data chips, each with a major loop and a plurality of associated minor loops, may be e treated together. It is common to arrange such data chips in rows and then even to stack rows of data chips in time-multiplexed layers to achieve complex memory structures, the data bubbles in all of the loops in all of the chips being synchronized with the in-plane rotations.

Typically, all of the minor loops on a chip, upon command, transfer in parallel the bubbles from their corresponding positions to the major loop. The bubbles are then serially detected as they are propagated past a read position. New data may also be inserted at a write position for parallel transfer back into the minor loops at an appropriate time later (when major loop bubble propagation aligns the data for transfer).

Simultaneous reading/writing of data into a grouping of related major loops gives the capacity of treating related bubbles as digital, or other coded, words. Time-muliplexed groups of data chips permits data annihilation, if desired, and writing of new data in a time sharing fashing to permit overall data processing to be done faster than bubble propagation in a single chip permits.

Although a bubble memory system employing major-minor loops of the type described has numerous economic and operational advantages, there is at least one major economic shortcoming of fabricating such a system. Every loop in every chip of the system has to be physically perfect for the system to perform operationally satisfactorily. Since chips contain entire groupings of registers, a minor flaw in one minor loop requires the discarding of the entire chip. Unlike a system comprising discrete components, it is not possible to replace only one faulty component and have the remainder of the good components intact. Although it is relatively easy to fabricate chips wherein only one or two of the minor loops may be open or otherwise faulty, it is relatively difficult and exacting to make a chip wherein every loop is in perfect condition. Therefore, when perfect chips are required the required stringent quality standards render the overall production cost of a bubble memory system undesirably high because a large percentage of the chips have to be thrown away.

It is therefore a feature of this invention to provide an improved system of using major-minor loop magnetic domain organizations to allow the use of data chips having one or more faulty minor loops.

It is another feature of this invention to provide an improved major-minor loop magnetic domain memory system employing a flag chip as means for synchronously operationally detecting faulty loops in related data chips.

It is still another feature of this invention to provide an improved major-minor loop magnetic domain memory system employing a flag chip as means for disregarding data from faulty loops in related data chips.

it is yet another feature of this invention to provide an improved major-minor loop magnetic domain memory system employing a flag chip as means for preventing data from being inserted into faulty loops in related data chips.

SUMMARY OF THE INVENTION

A preferred bubble memory system in accordance with the present invention comprises a plurality of data chips, each with a major loop, a plurality of minor loops, and transfer gates therebetween. The jamor-minor loop chip concept referred to herein should not be regarded as being restricted to the referenced arrangement disclosed in U.S. Pat. No. 3,618,054, P. I. Bonyhard et al. Rather, the present concept is applicable to all memories comprised of multiple data loops which communicate with serial input/output track(s) at, at least, one point on each data loop. Rotating in-plane magnetic field means propagates the bubbles around the loops and pulsing means is conventionally used to transfer the bubbles through the transfer gates on command. Each data chip contains an extra minor loop, or more, on the off chance that there may be one or more faulty minor loops on the data chips.

A flag chip is included which has a major loop, a plurality of perfect, preferably one-bit minor loops and appropriate transfer gates therebetween. A detector is connected to each of the data chip major loops and to each flag chip major loop.

Combination data in corresponding loops in each of the data chips constitutes a data "word". If any minor loop is faulty, then a data word which includes bubbles from that loop may be in error.

Simultaneous detection of data from the flag chip major loop with detection of a data word from the data chip major loops provides means for skipping a word position where there is a faulty minor loop in any of the data chip minor loops for that word in favor of the next position where all of the loops in the word are good. Such skipping is useful for utilizing perfect groupings of loops and for bypassing or ingnoring faulty loops. Since read and write occurences from the major loops of the data chips and the flag chip are not simultaneous, a delay circuit or second detector means may be employed on the flag chip in connection with the write operation. Electronic means for delay alternatively may be used.

BRIEF DESCRIPTION OF THE DRAWINGS

So that the manner in which the above-recited features, advantages and objects of the invention, as well as others which will become apparent, are attained and can be understood in detail, more particularly description of the invention briefly summarized above may be had by reference to the embodiments thereof which are illustrated in the appended drawings, which drawings form a part of this specification. It is to be noted, however, that the appended drawings illustrate only typical embodiments of the invention and are therefore not to be considered limiting of its scope, for the invention may admit to other equally effective embodiments.

In the Drawings.

DESCRIPTION OF PREFERRED EMBODIMENTS

Figure 1:
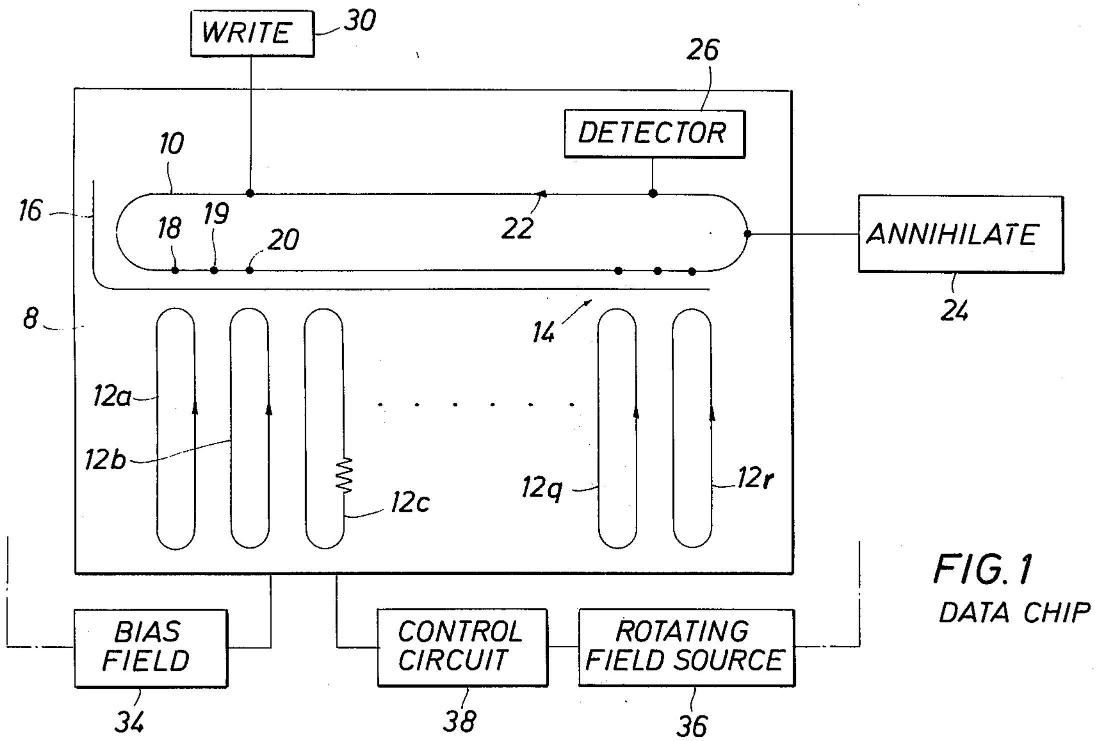
FIG. 1 is diagram, partly in block form and party in schematic form, of a data chip employed in a bubble memory system in accordance with the present invention.

Now referring to the drawings, and first to FIG. 1, a major-minor bubble memory organization is shown. Except for the presence of an illustrated faulty minor loop, it is similar to the organization shown in U.S. Pat. Nos. 3,613,056; 3,618,054; and 3,729,726, among others. The conditions for establishing single wall magnetic domains on suitable material 8, such as a rare earth orthoferrite platelet or a rare earth iron garnet film grown on a nonmagnetic substrate, are well known in the art. One article on the subject, which is hereby incorporated by reference, is the previously mentioned article appearing in IEEE Transactions on Magnetics, Vo. MAG.-5, No. 3 (1969), pp. 554–553. Patterns of magnetically soft overlay material (e.g., permalloy) of bar and T-shaped segments are commonly employed to determine the loop patterns. One long loop identified as major loop 10, closes on itself so that circulating bubbles established in the loop, in time, and provided they are not annihilated or transferred out, circulate indefinitely.

Aligned opposite major loop 10 are a series of identical minor loops 12*a*, 12*b*, . . . 12*r*. Minor loop 12*c* has a fault in it indicated by the wavy line, the significance of which will be hereinafter explained. For illustrative purposes, eighteen minor loops are shown, although a different number may be selected as desired for a specific application. One portion (the nearest to major loop 10) of each minor loop acts as part of a two-way port or transfer gate 14 with the major loop. Transfer of bubbles or domains through the gate may be accomplished by pulsing transfer line 16, which is part of all of the transfer gates between minor loops 12*a*–12*r* and major loop 10. This detail is more fully disclosed in the U.S. Pat. No. 3,613,054 also incorporated herein by reference.

A transfer pulse applied to transfer line 16 causes bubbles (or the absence of bubbles) in all of the transfer gates to pass from all of the minor loops to the major loop simultaneously. This parallel transfer signifies the transfer of a related data segment. In a similar manner, by altering the pulse current and timing, data may be transferred from the major loop in parallel back into the major loops.

As illustrated, it is conventional that there be a data position between each of the bubbles transferred to the major loop. For example, bubble position 18 is shown opposite minor loop 12*a*. Bubble position 19 is shown between loops 12*a* and 12*b* on the major loop and bubble position 20 is shown opposite minor loop 12*b*. Bubble positions 18, 19 and 20 are consecutive bubble positions on major loop 10.

Once in the major loop, bubbles are circularly propagated in transfer direction 22 by an in-plane rotating magnetic field, each rotation signifying four steps in the T-bar advancement sequence as described in U.S. Pat. No. 3,613,054. An annihilate means 24 may be attached to major loop 10 at a convenient position, normally along the loop between the time bubbles propagate past the last of the minor loops, loop 12*r*, and before they are re-introduced into the first of the minor loops, loop 12*a*.

Also connected to the major loop is a detector circuit 26, to be more fully explained hereafter. Further downstream along major loop 10 is connected write circuit 30.

The detector circuit 26 may be used to monitor the bubble data sequence passing the point of the major loop to which connection is made and write circuit may supply new data information, as desired, into major loop 10 at the point where its connection is made.

A bias field supplied by source 34 maintains single wall domains in material 8 at nominal operating size, as is well known. A rotating field source 36 may, for example, cause movement of the domains to occur in counterclockwise direction 22. As previously described, this movement occurs simultaneously in all loops. Finally, rotating field source 36 is under the control of a control circuit 38 for activation and synchronization. The bias source 34, control circuit 38, rotating field source 36, and other auxiliary circuits (such as pulsing circuit for application to transfer line 16, counter circuits for tracking the bubbles in the loops, etc.) are well known. Although not specifically illustrated in each case, such ancillary circuits may be used in connection with the illustrated embodiments, as desired.

Figure 2:
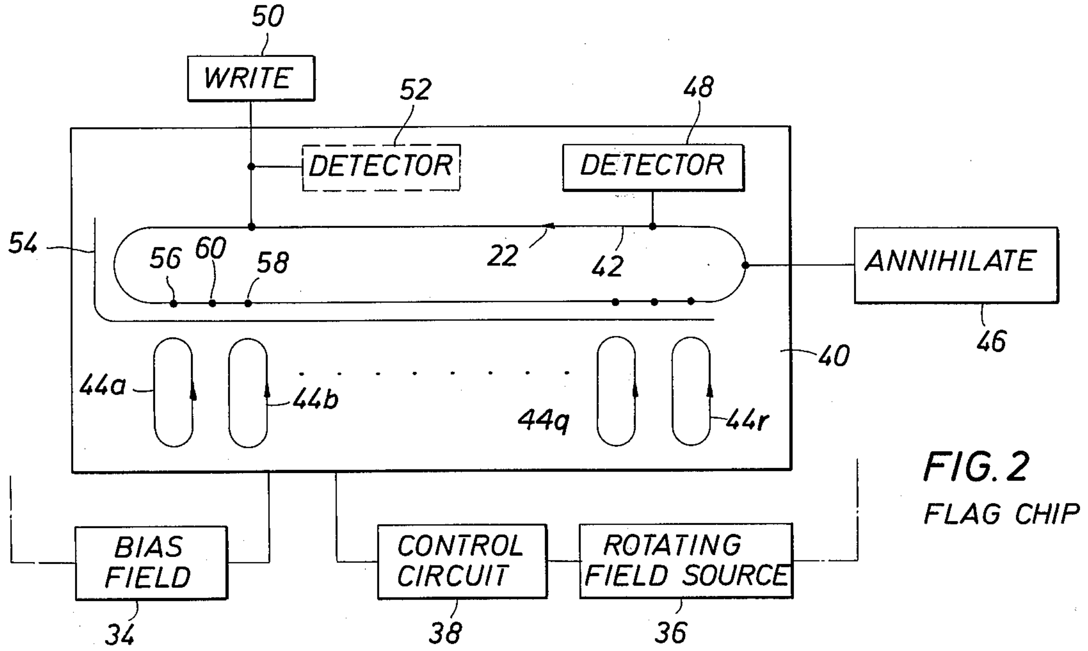
FIG. 2 is a diagram, partly in block form and partly in schematic form, of a flag chip employed in a bubble memeory system in accordance with the present invention.

Now referring to FIG. 2, a flag chip 40 in accordance with the present invention is illustrated. In conjunction with flag chip 40 are bias fields 34 and 36, as above described, and control 38, also as above described. The flag chip, like the data chip illustrated in FIG. 1, contains a major loop 42 and a plurality of minor loops 44*a* – 44*r*. Eighteen minor loops, the same number as for the data chip, are required.

Again, as with the data chip, bubbles may, for example, propagate in counterclockwise direction 22 on each of the flag chip loops. Connections are made to the major loop to annihilate means 46, to detector circuit 48 and to write circuit 50. In addition, a second detector circuit 52 may be connected at the same location relative to the major loop as write circuit 50. Transfer line 54 connected to transfer pulsing means (not illustrated) is connected for transferring bubbles from the flag chip minor loops 44*a*–44*r* to flag chip major loop 42.

As illustrated, there is a bubble position, e.g., 56 and 58, on the major loop opposite each minor loop and a position for a bubble (e.g., 60) in between each of these bubble positions previously mentioned. In operation, as will be explained, the presence of a bubble domain in a flag chip minor loop 44*a*–44*r*, meaning logic "one", indicates a defect in a corresponding word and the absence of a bubble domain in a flag chip minor loop, meaning logic "zero" indicates that there is no defect in the loops corresponding to the word. An indication of a one may alternatively be provided by the absence of a domain, however, if desired, and a zero may be represented by the presence of a domain. For convenience, since the information provided by a flag chip minor loop is an either/or situation, each flag chip minor loop may contain only one bit of information, or, in other words, be merely a one-bit loop. With certain major/minor loop designs, it is necessary to use more than one bit in each flag chip minor loop. In any case, the number of bits in each flag chip minor loop is very small in comparison to the number of bits in each data chip minor loop. Thus, the flag chips will be much smaller than the data chips and thus more inexpensive to manufacture.

Figure 4:
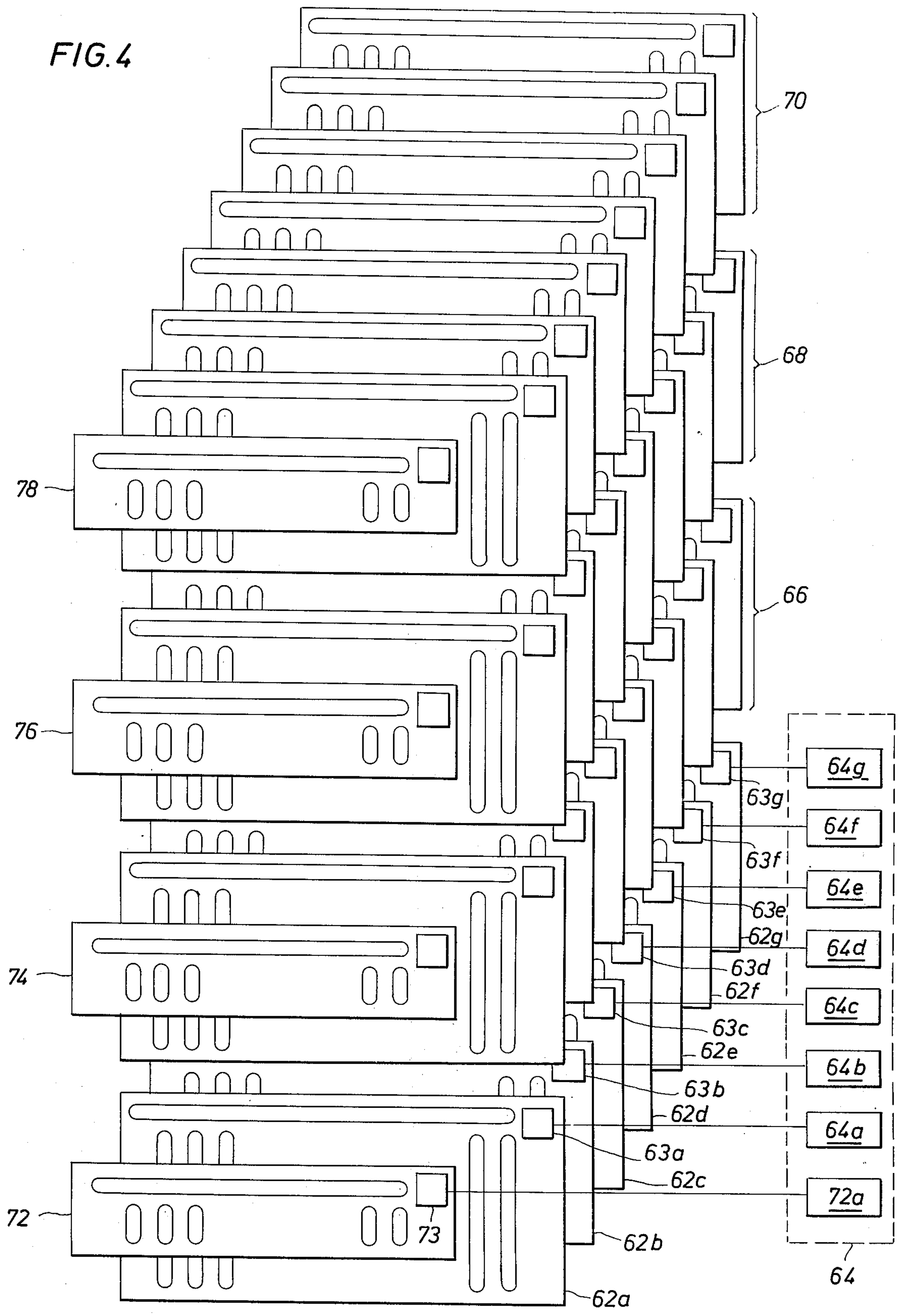
FIG. 4 is a diagram, partly in block form and partly in schematic form, of a bubble memory system in accordance with the present invention.

To more clearly understand how a flag chip operates in conjunction with one or more data chips, consider deployment of the chips in FIG. 4 and a connection of these chips into a shift register. The shift register is conventionally organized into m different n-bit words so that only one word may be inputted or outputted in parallel to or from a row of major loops at any given instance. Other words are multiplexed in time to economize on associated electric circuitry.

Referring specifically to FIG. 4, a register is shown capable of handling seven-bit data words. For example, the bottom row of seven data chips comprises data chips 62*a* through 62*g*. The magnetic bubble detectors 63*a*–63*g* which communicate with the major loops on each of these chips are in turn connected to an electrical amplifier circuit 64, there being therein a separate circuit 64*a* through 64*g*, respectively, connected at the corresponding position to the detectors 63*a* – 63*g* of chips 62*a* through 62*g*. Hence a word comprises the bits (the presence and absence of bubbles) transferred simultaneously to the detector elements 63*a* – 63*g* on each chip 62*a*–62*g* and amplified by the amplifiers 64*a*–64*g*.

As previously mentioned, after a transfer of parallel data from the minor loops on a chip to its major loop, all of the data is subsequently propagated past all of the loops and detected before another set of data is transferred from the minor loops. To economize on drive components and the like, additional rows 66, 68 and 70 of data chips may be included in a registered and time-multiplexed operation with the first row of data chips just described so that the necessary electric support circuits are shared. For simplicity, the amplifier connections for these subsequent rows are not illustrated.

Figure 3:
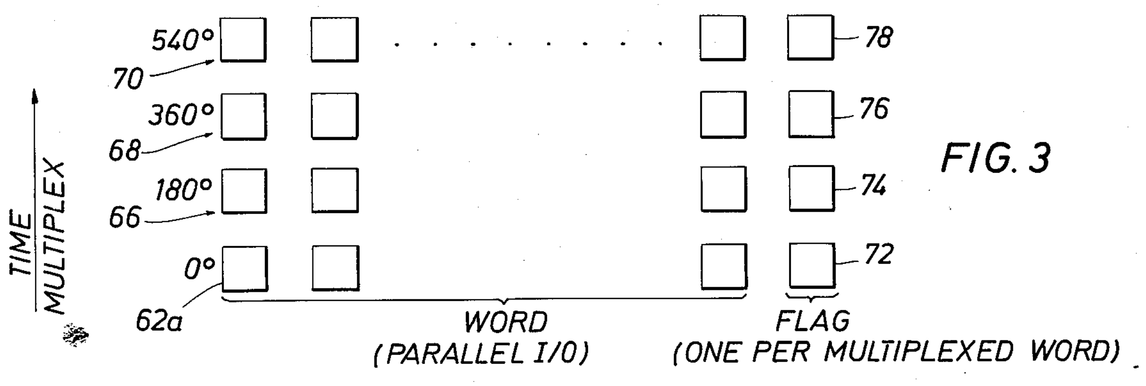
FIG. 3 is a graphical display of a dynamic minor loop redundancy scheme useful in a preferred embodiment of the present invention.

A flag chip is included in each row of data chips as in FIG. 3. For example, flag chip 72 may be included in the row comprising data chips 62*a*–62*g*, flag chip 74 is included in row 66, flag chip 76 is included in row 68 and flag chip 78 is included in row 70. Flag chips 72, 74, 76 and 78 may be of the type described in connection with FIG. 2. The one or two detectors communicating with flag major loop of flag chip 72 are connected in series and then electrically connected to amplifier element 72*a*, which is operating in conjunction with amplifier elements 64*a*–64*g*.

In order to better understand the operation, assume that the data chip shown in FIG. 1 is included as one of the data chips 62*a*–62*g*, for example, data chip 62*a*. That is, all of these data chips have perfect loops, except for data chip 62*a*, which has an open or otherwise defective minor loop 12*c*. Assume further that this was known prior to the construction of the register shown in FIG. 4. When flag chip 72 was included in the register, its third flag minor loop, corresponding to minor loop 12*c* had a bubble inserted as the loop's single bit of information, designating a logic one for that flag minor loop.

When the data is to be transferred from the bottom row (row 62) of data chip major loops to amplifier 64, data is simultaneously transferred from the flag minor loops into the flag major loop on flag chip 72. In this case, there is only one bubble that is transferred. This is the one from the third flag minor loop. Data is then propagated around the major loops of the data chips and around the flag chip major loop to be sequentially and simultaneously detected and amplified. Normal operation occurs so long as the detector on flag chip 72 and its amplifier 72*a* detect the absence of bubbles, i.e., logic zero. However, when the bubble, signifying logic one, is detected and amplified (that was put into the loop from the third flag minor loop), the register control circuits (not shown) signal the device which is using the data to disregard the data that is then being presented to it by amplifier units 64*a*–64*g*, namely, the data that corresponds to the third row of minor loops on all of the data chips.

In a similar manner, the flag chip in each row of data chips flags and causes the disregarding of data from a row of minor loops when there is any minor loop in the row that is defective.

In inspecting fabricated data chips, it may be recognized that all of the data chips with the third minor loop defective (but no other) may be placed in one bin, all those with first defective minor loops placed in a second bin and so forth to result in a segregated inventory of data chips. At the same time of assembly of a register, one row can then be made up of data chips having the same corresponding defective minor loops. In operation, the whole row of minor loops are disregarded if there is a defect in any one loop in the row. Therefore, it is economically favorable to match data chips with the same defects for parallel operation.

If a series of 16 related words is specified as with the chips illustrated in FIGS. 1 and 2, there may be 18 minor loops, or two extra minor loops, actually fabricated on each data chip. This permits subsequent disregarding of two minor loops without endangering full operation of the 16-loop register. Of course, there would also be eighteen minor flag loops on each flag chip so that any two defective data loops may be flagged.

In FIG. 2, it may be seen that a second detector means, one element of which is detector 52, may operate in conjunction with write connection 50. That is, the detection of a logic one in the form of a bubble from a flag chip minor loop in the manner above described, is useful in a related logic circuit to prevent the writing of new data via write connection 30 into a defective data chip minor loop. That is, each time the write means would otherwise insert new data into its corresponding major loop while there was present a flag chip bubble being detected, there would be a delay of position insertion until there was an absence of flag bubble (indicating that the data was being inserted only into perfect data chip minor loops).

The same result may be accomplished by including a time delay element or memory controller in conjunction with the circuit of amplifiers 64. When a bubble is detected by the detector 73 on flag chip 72, this would have the effect of causing the device using the data presented by amplifiers 64*a*–64*g* to disregard the corresponding data then being presented for detection. In addition the delay element would start so that at the time write connection 30 and the other write connections are enabled to insert new data into a row of data chip major loops, there will be an overriding delay from amplifier element 72*a* indicating that the time is inappropriate because insertion would place data into a faulty minor loop. There would, in effect, be a further delay until a time when data would be inserted into only perfect minor loops on all data chips.

Actually, the most satisfactory control has been found in detecting the flag bits slightly ahead of detecting or writing data bits, to permit the memory controller to respond accordingly, as previously discussed.

As mentioned, the flag bits in the flag chips minor loops may be set to one at the time of register assembly when the data chips have been inventoried and matched. Alternatively, the flat bits may be set during active use of the assembly. If a parity check fails repeatedly for a given word, the host computer may enter a software routine to shift the remaining data to good minor loops and at the same time set a flag bit via write connection 50. Hence, use of redundant or non-used minor loops on the data chips permits utilization of data chips that have material or process defects which occur during fabrication and that develop dynamic failures during use.

Flag bit annihilation via annihilate connection 46 may be performed if data chips with bad loops are replaced during repairs or if defective loops begin to operate for any other reason.

It will be understood that the bubble memory system of this invention may be equipped with other functions typically associated with systems of this character. For example, the data chip of FIG. 1 may be provided with a replicate connection (not shown) at the junction between the major loop 10 and the detector circuit 26 for reproducing a duplicate bubble for each respective bubble cycled on the major loop 10, with the duplicate bubble being directed to the detector circuit 26. Use of the replicate function with data chips as described would make the bubble memory system of this invention mon-destructive in character with respect to the data being processed thereby.

While particular embodiments of the invention have been shown, it will be understood that the invention is not limited thereto, since many modifications may be made and will become apparent to those skilled in the art.

What is claimed is:

1. A bubble memory system, comprising
a data chip including
a major propagation path means, a plurality of minor loops, at least one of which is faulty, transfer means for each minor loop for transferring information bubbles to and from said minor loops and said major path means;

a flag chip including a flag major bubble propagation path means, a plurality of flag minor loops, and transfer means for each flag minor loop for transferring bubbles to and from said flag minor loops and said flag major path means rotating in-plane magnetic field means for propagating bubbles along said major path means for said data chip and said flag chip and said flag chip and around said loops;

means for effecting bubble transfer through said transfer means; and detector means connected to said flag major path means for the serial detection of bubbles thereon, a detection of a bubble on said flag major path means corresponding to a flag minor loop emanating said bubble indicating a fault in the data chip minor loop corresponding to said flag minor loop.

2. A bubble memory system as set forth in claim 1, wherein said major path means for said data chip comprises a major loop and said flag major path means for said flag chip comprises a flag major loop.

3. A bubble memory system as described in claim 2, wherein each of said flag minor loops has a one-but flag data capacity.

4. A bubble memory system as described in claim 2, and including read means connected to said data chip major loop and to said detector means, an indication of a minor loop fault from said detector means to said read means being effective to permit data from said faulty data chip minor loop to be disregarded in favor of subsequent data.

5. A bubble memory system as described in claim 2, and including write means connected to said data chip major loop and to said detector means, an indication of a minor loop fault from said detector means preventing said write means from inserting data into the data position corresponding to said faulty data chip minor loop in favor of later insertion.

6. A bubble memory system as described in claim 2, and including read means connected to said data chip major loop and to said detector means, an indication of a minor loop fault from said detector means to said read means being effective to permit data from said faulty data chip minor loop to be disregarded in favor of subsequent data, delay means connected to said detector means, and write means connected to said data chip major loop and to said delay means, an indication of a minor loop fault from said detector means preventing said write means from inserting data into the data position corresponding to said faulty data chip minor loop in favor of later insertion.

7. A bubble memory system as described in claim 2, and including read means connected to said data chip major loop and to said detector means, an indication of a minor loop fault from said detector means to said read means being effective to permit data from said faulty data chip minor loop to be disregarded in favor of subsequent data, second detector means connected to said flag major loop subsequent to said read means for the serial detection of bubbles thereon, a detection of a bubble from said flag major loop corresponding to a flag minor loop emanating said bubble indicating a fault in the data chip minor loop corresponding to said flag minor loop, and write means connected to said data chip major loop and to said second detector means, an indication of a minor loop fault from said detector means preventing said write means from inserting data into the data position corresponding to said faulty data chip minor loop in favor of later insertion.

8. A bubble memory system including a plurality of data chips, each of said data chips including a major bubble propagation path means, a plurality of minor loops, and transfer means for each minor loop for transferring information bubbles to and from said minor loop and said major path means, a flag chip including a flag major bubble propagation path means, a plurality of flag minor loops, and transfer means for each flag minor loop for transferring bubbles to and from said flag minor loops and said flag major path means;

rotating in-plane magnetic field means for propagating bubbles along said major path means for each of said data chips and said flag chip and around said loops;

means for effecting bubble transfers through said transfer means; and detector means connected to said major path means and said flag major path means for the serial detection of bubbles on each of said major path means and said flag major path means corresponding to the insertion thereof of data from said minor loops, the detection of a bubble in said flag major path means, which corresponds to a specific flag minor loop, causing said detector means to disregard data from any one of said major path means corresponding to data chip minor loops that are related to said specific flag minor loop, at least one of said related data chip minor loops being faulty.

9. A bubble memory system as set forth in claim 8, wherein said major path means for each of said plurality of data chips comprises a major loop and said flag major path means for said flag chip comprises a flag major loop.

* * * * *